United States Patent [19]

Wilson et al.

[11] 3,976,150

[45] Aug. 24, 1976

[54] ENDLESS CONVEYOR BELT LOAD MEASUREMENT SYSTEM AND METHOD OF AUTOMATICALLY CALIBRATING SAME

[75] Inventors: George S. Wilson, Weston; Joseph T. Sniezek, Aurora, both of Canada

[73] Assignee: Ramsey Rec Ltd., Richmond Hill, Canada

[22] Filed: Oct. 24, 1974

[21] Appl. No.: 517,741

[30] Foreign Application Priority Data

Dec. 7, 1973 Canada.............................. 187645

[52] U.S. Cl. ................................. 177/16; 73/1 B; 177/25; 198/39; 235/151.33
[51] Int. Cl.² ........................................ G01G 11/14
[58] Field of Search......................... 198/39, 40, 37; 235/151.33; 177/25, 119, 120, 121, 122, 123, 16; 73/1 B

[56] References Cited

UNITED STATES PATENTS

| | | | |
|---|---|---|---|
| 2,637,434 | 5/1953 | Harper.................................. | 198/39 |
| 2,997,175 | 8/1961 | Gordon............................ | 177/25 UX |
| 3,868,643 | 2/1975 | Bullivant.......................... | 117/119 X |

*Primary Examiner*—Evon C. Blunk
*Assistant Examiner*—Douglas D. Watts
*Attorney, Agent, or Firm*—George H. Riches & Associates

[57] ABSTRACT

This invention relates to an endless conveyor belt load measurement system and a method of automatically calibrating the same using a digital computer. Measuring means are provided to measure movement of the conveyor belt and scale means are provided to measure the weight of successive portions of the conveyor belt and the load carried thereby both having digital pulse output signals which are communicated to digital computer means. Means are provided to temporarily apply a selected number of calibration weights to the scale means while the conveyor belt is rotating empty. The computer means calculates average output signals received from the scale means during complete revolutions of the empty conveyor belt with varying members of the calibration weights applied to the scale means and substitutes these in a set of curve fitting linear equations to calculate a set of linearization coefficients. The rate of load carried by the conveyor belt and the total load delivered is then calculated by the digital computer means from the outputs of the movement measuring means and scale means using the calculated linearization coefficients. The system may be quickly, easily and accurately periodically recalibrated using the digital computer means by terminating the load on the conveyor belt, applying the calibration weights, calculating corrected values for the linearization coefficients and substituting them into the formula used to calculate the load carried by the conveyor belt.

1 Claim, 4 Drawing Figures

ENDLESS CONVEYOR BELT LOAD MEASUREMENT SYSTEM AND METHOD OF AUTOMATICALLY CALIBRATING SAME

BACKGROUND OF THE INVENTION

This invention relates generally to an endless conveyor belt load measurement system and more particularly to such a system utilizing a digital computer and a method of automatically calibrating the system. This system was developed for use in measuring the amount of iron ore being transported by an endless conveyor belt, but it may be adapted for use in transporting a variety of other substances in other applications.

In the past, conveyor belt load measurement systems have commonly operated by having independent weight and speed measurement transmitters with analog outputs using various methods of combining the two analog output signals to provide a resulting load measurement output signal which is received by suitable indicating and recording mechanism. These previous systems are normally calibrated by having a skilled instrument technician separately calibrate the weight and speed transmitter and the recording mechanism. This method of calibration has the disadvantage that it is relatively expensive in that it requires the presence of the instrument technician and necessitates interruption of the load during the lengthy calibration period. Furthermore, the errors in calibration of the transmitters may be cummulative when the two transmitted signals are combined.

More recently, it has been suggested that calibration of these previous analog systems be provided by calibrating the combined analog signal in terms of actual measured load. While being an improvement, this has the disadvantage that with conventional instrumentation it is difficult to compensate for non-linearities in the combined weight and speed transmitted signals, and furthermore that a skilled instrumentation technician is still required to be on hand to provide this calibration.

SUMMARY OF THE INVENTION

Accordingly, it is an object of the present invention to at least partially overcome these disadvantages by providing an endless conveyor belt load measurement system utilizing conveyor belt movement measuring means and scale means having digital pulse outputs which are received by a digital computer which is adapted to calculate the load carried by the conveyor belt and to automatically adjust the calculation upon calibration of the system including provision for non-linearities in the system.

To this end, in the conveyor of its aspects, the invention provides an endless conveyor belt load measurement system comprising movement measuring means having a digital pulse output ($P_s$) for measuring the movement of the conveyor belt; means to determine one complete revolution of the conveyor belt; scale means having a digital pulse output ($P_w$) adapted to measure the weight of successive portions of theconveyor belt and the load carried thereby; calibration weight applying means adapted to apply a weight of a known value ($T_1$) to the scale means; and digital computer means connected to receive the digital pulse outputs of the movement measuring means and the scale means, the digital computer means adapted to calculate the average pulse output of the scale means during one complete revolution of the empty conveyor belt ($P_{w0}$), calculate the average pulse output of the scale means during one complete revolution of the empty conveyor belt with the calibration weight applied to the scale means ($P_{w1}$), and substitute the said average pulse outputs of the scale means into a formula to calculate the load carried by the conveyor belt.

In another of its aspects, the invention further provides a method of automatically calibrating a system for measuring load on successive portions of an endless conveyor belt comprising the steps of rotating the empty conveyor belt one complete revolution and calculating the average digital pulse output of the scale means ($P_{w0}$) using digital computer means, applying a calibration weight ($T_1$) of a known value to the scale means, rotating the empty conveyor belt one complete revolution with said calibration weight applied to the scale means and calculating the average digital pulse output of the scale means ($P_{w1}$) using digital computer means, and using digital computer means to substitute the said calculated average pulse outputs of the scale means into a formula applied by the digital computer means to calculate the load on successive portions of the conveyor belt.

Further objects and advantages of the invention will appear from the following description taken together with the accompanying drawings.

DESCRIPTION OF THE PREFERRED EMBODIMENT

Figure 1:
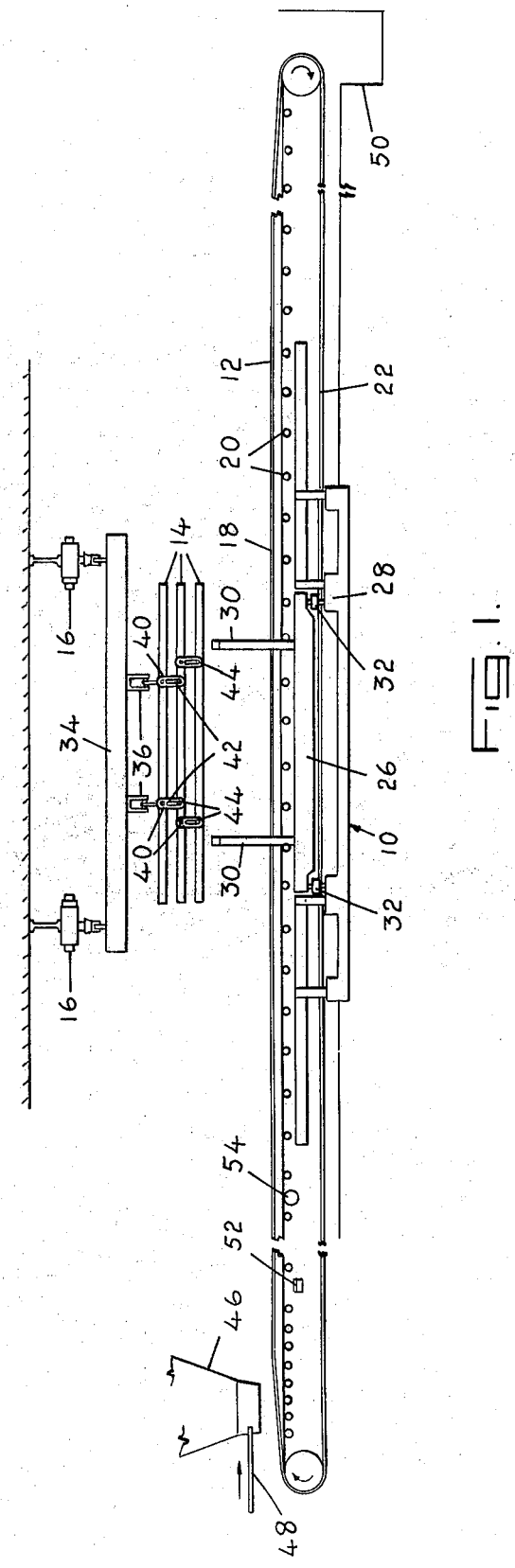
FIG. 1 is a schematic front elevation view of an endless conveyor belt on which the load is to be measured showing a weigh scale and apparatus for applying calibration weights to the weigh scale according to a preferred embodiment of the invention.
Figure 2:
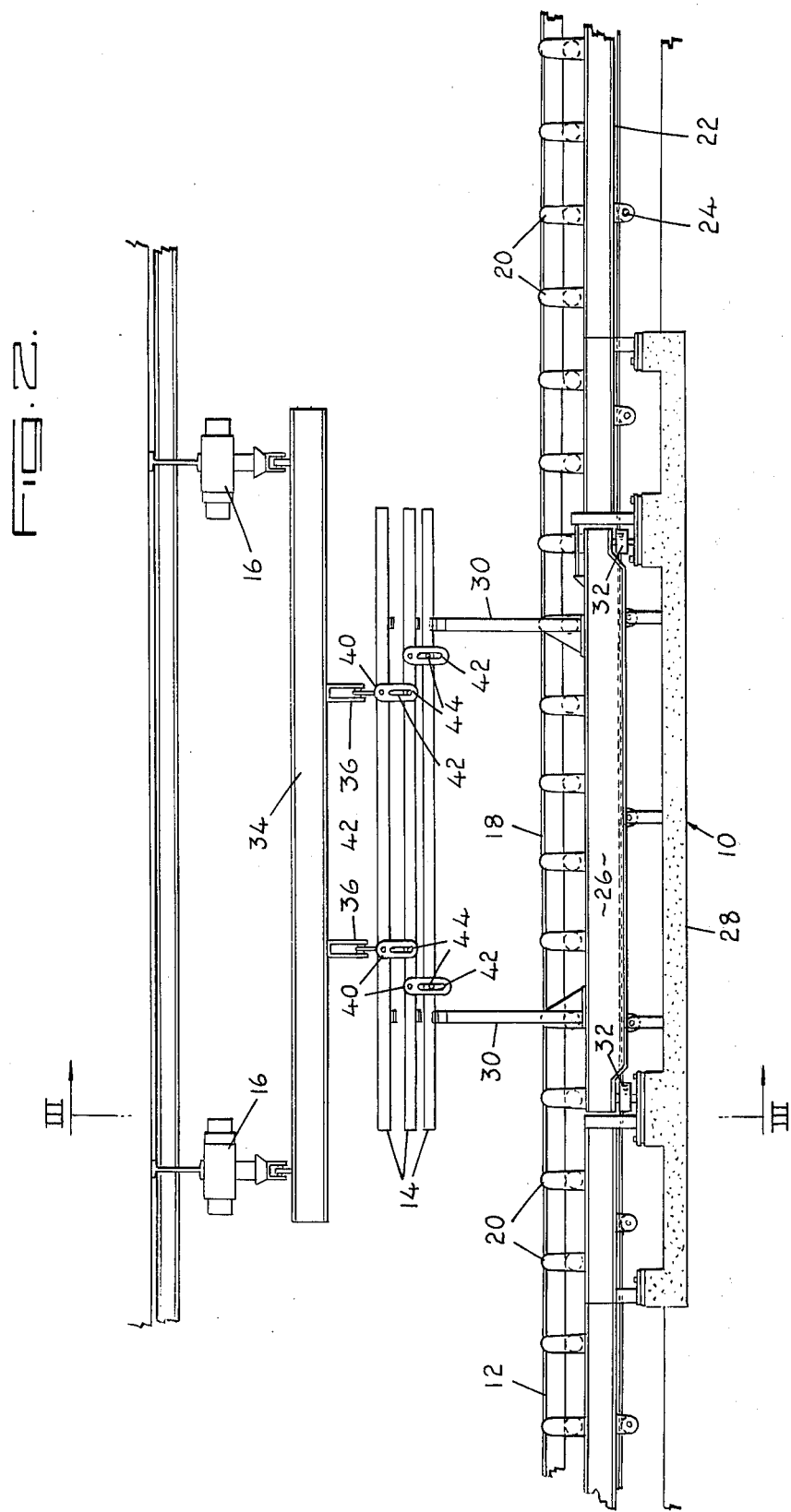
FIG. 2 is a similar close up view showing a portion of the conveyor belt seen in FIG. 1.
Figure 3:
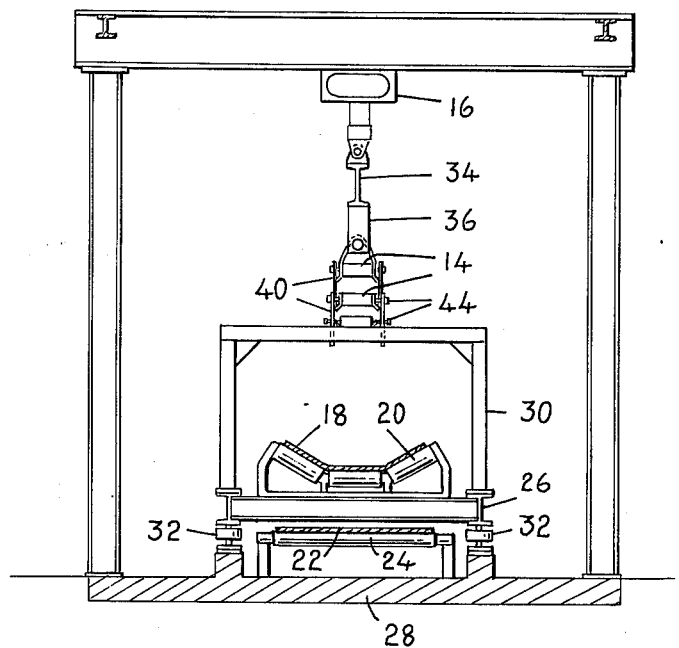
FIG. 3 is a cross sectional view along lines III—III in FIG. 2.

Reference is first made to FIGS. 1 to 3 which show a weigh scale station 10 which supports a portion of the length (25 feet in this embodiment) of the endless conveyor belt 12 and the load carried thereby. A selected number of calibration weights 14 may be applied to the weigh scale station 10 by operating hoists 16.

As may be seen, the upper portion 18 of the conveyor belt 12 which carries the load is supported by a number of spaced load bearing idlers 20, while the lower return portion 22 of the conveyor belt 12 is supported by a number of spaced return idlers 24. The weigh scale station 10 has a horizontal rectangular rigid frame 26 which supports the load bearing idlers 20 along its length. The corresponding return idlers 24 which carry the lower return portion 22 of the conveyor belt 12 beneath the frame 26 are supported by rigid base 28. The frame 26 also supports two longitudinally spaced inverted U-shaped members 30 which extend above the conveyor belt 12 to receive the calibration weights 14 when they are lowered by the hoists 16. The U-shaped members 30 are normally bolted to the frame 26 to permit their removal if necessary. The frame 26 is supported at each corner by a load module 32 mounted on base 28. Each load module 32 incorporates a strain guage load cell mounted in a housing with an insulated protective shell having spherical mounts and bearings and a heater and thermostat. Each load cell is supplied with an electrical power supply and produces an electrical output signal proportional to the load applied, in a conventional manner. Three calibration weights 14 are shown in this embodiment formed by longitudinal beams of equal weight. They are horizontally suspended one above the other from extending rigid member 34 which in turn is suspended from two electrical hoists 16. The uppermost calibration weight is connected to rigid member 34 by spaced couplings 36. The calibration weights 14 are interconnected in each case by horizontally spaced pairs of lost motion links 40 which have vertically extending slots 42 therein which engage pins 44 extending horizontally from the opposite sides of the calibration weights 14. As may be seen, this structure permits an operator to operate the hoists 16 in unison to vertically raise or lower the rigid member 34 a predetermined amount to deposit a selected number of the calibration weights 14 on the inverted U-shaped members 30. Suitable limit switches (not shown) may be added to permit remote operation of the hoists 16 to apply a desired number of the calibration weights 14 to the weigh scale station 10.

Referring to FIG. 1, in transporting the load from the load applying means (illustrated by a hopper 46 with a sliding door 48 for controlling the rate at which the load is applied) to the load receiving means 50, the conveyor belt 12 passes by photocell 52 and belt movement transmitting means 54. The photocell 52 reacts to a painted white mark (not shown) on the underside of the belt to determine one complete revolution of the belt. The movement transmitting means 54 includes a perforated disc attached to a roller which is in contact with the underside of the belt to rotate with movement of the belt. The perforated disc interrupts a beam of light directed on a photosensitive element to create pulses, the number of which is therefore an analog of the distance the conveyor belt has moved.

Figure 4:
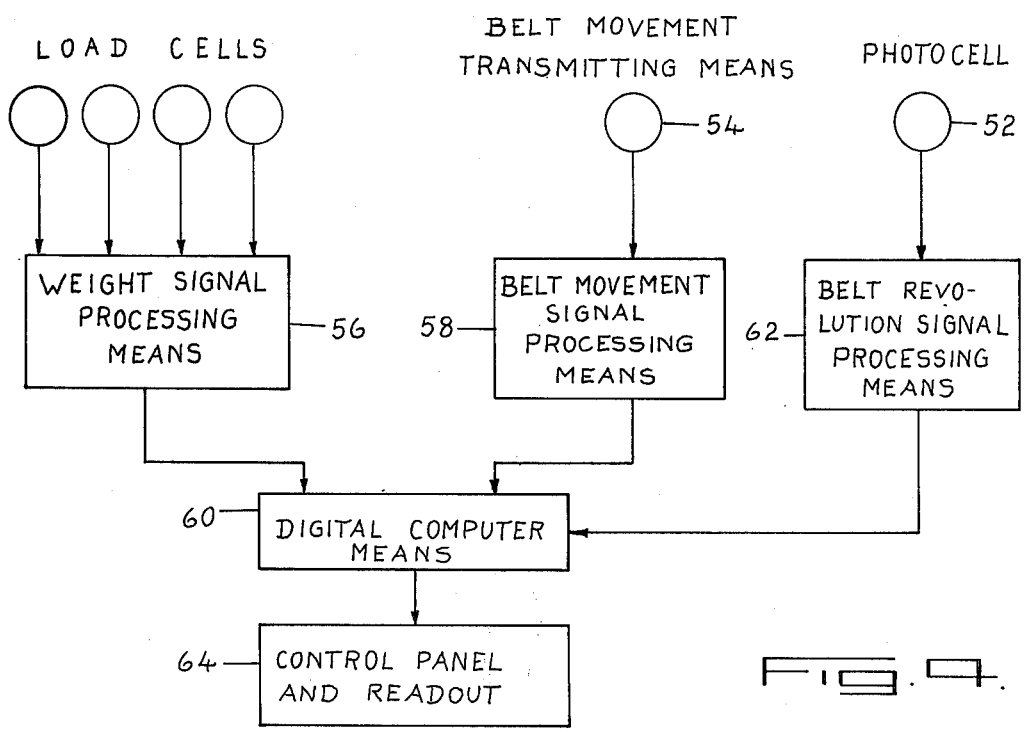
FIG. 4 is a block diagram of a system according to a preferred embodiment of the invention.

Referring now to FIG. 4, the four load cells in the four load modules 32 are connected to weight signal processing means 56 wherein the four analog output signals from the load cells are combined into a single digital representation ($P_w$) (in binary coded decimal form) representative of the total weight on the load cells. In the preferred embodiment, the weight signal processing means 56 includes in the following order; a compensating module, an amplifier, a filter, a voltage to frequency converter, a pulse amplifier, and a counter. Similarly, the belt movement transmitting means 54 is connected to belt movement signal processing means 58 wherein the analog pulse output of the movement transmitting means 54 is transformed into a digital pulse output representation ($P_s$) (in binary coded decimal form). In this embodiment, the movement signal processing means 58 is a counter. The weight signal processing means 56 and movement signal processing means 58 are connected to digital computer means 60 which receives the weight and movement binary coded decimal outputs to calculate the load on the conveyor belt in the manner described below. In the embodiment shown, the photocell 52 is connected through belt revolution signal processing means 62 to the digital computer means 60 whereby the number of output pulses from the belt movement measuring means 54 during one complete revolution of the conveyor belt may periodically be determined. Alternatively, this may be provided by connecting the photocell 52 to a counter receiving the output pulses from the movement transmitting means 54 and periodically entering the total number of output pulses counted during one complete revolution of the conveyor belt into the digital computer means 60 using a teletype keyboard in a conventional manner. By way of example only the digital computer means 60 may be a DATAGEN NOVA 1220 unit, with an 8K memory. The digital computer means 60 of course has a suitable control panel and readout 64 to provide for operation of the system as described below and recordal of the calculated load carried by the conveyor belt.

In the following description of the operation of the system, a number of formulae are given using a variety of symbols, the definitions of which (with units) are given on page 11 of the disclosure. For convenience, a numbered list of the formulae is also provided as page 12 of the disclosure. Initially the system is calibrated as follows. Following rotation of the conveyor belt 12 one complete revolution (as determined by photocell 52) with no load on it, the digital computer means 60 calculates the average ($P_{w0}$) of the digital pulse output ($P_w$) received from the weight signal processing means 56 according to the formula;

$$P_{w0} = \frac{1}{t_0} \int_{t=0}^{t_0} P_w dt \tag{I}$$

The calibration weights 14 are then lowered by hoists 16 until the lowermost one having a known value $T_1$ rests on the U-shaped members 30 of the weigh scale station 10. The digital computer means 60 then calculates the average digital pulse output ($P_{w1}$) of the weight signal processing means 56 during another complete revolution of the empty conveyor belt 12 with the weights in this position according to the formula;

$$P_{w1} = \frac{1}{t_1} \int_{t=0}^{t_1} P_w dt \tag{II}$$

The hoists 16 are then operated to lower a second calibration weight 14 onto the weigh scale station 10, in which position the empty conveyor belt 12 rotates another complete revolution. The digital computer means 60 then calculates the average digital pulse output ($P_{w2}$) of the weight signal processing means 56 with total calibration weight $T_2$ applied to the weigh scale station 10. This step is repeated, adding additional calibration weights 14 in steps and calculating the average digital pulse output ($P_{wi}$) at each step until n calibration weights are applied to the weigh scale station 10. The digital computer means 60 then calculates a set of linearization coefficients ($K_i$), by solving the following conventional set of $n$ curve fitting linear algebraic equations:

$$
\begin{aligned}
K_0 + K_1 P_{w0} + \ldots + K_n P_{w0}^n &= a_1 T_0 (=0) \\
K_0 + K_1 P_{w1} + \ldots + K_n P_{w1}^n &= a_1 T_1 \\
&\vdots \\
K_0 + K_1 P_{wn} + \ldots + K_n P_{wn}^n &= a_1 T_n
\end{aligned}
\tag{III}
$$

wherein $a_1$ is a predetermined conversion constant. While only three calibration weights are illustrated, it is apparent that any suitable number of weights may be applied in a similar manner. The calibration weights are then all removed from the scale station 10 by lifting them with the hoists 16, and a load is applied to the conveyor belt 12 by opening door 48 of hopper 46. Upon receipt of digital pulse outputs from the weight signal processing means 56 and movement digital processing means 58, the digital computer means 60 substitutes the calculated linearization coefficients ($K_i$) in the following formula to calculate the load carried by successive portions of the conveyor belt 12 in long tons per ft. (W);

$$W = a_2 \sum_{i=0}^{n} K_i P_w{}^i \qquad (IV)$$

wherein $a_2$ is a predetermined conversion constant. The digital computer means 60 then utilizes the digital pulse output ($P_s$) received from the belt movement signal processing means 58 to calculate the load carried by the conveyor belt 21 in long tons per second ($W_t$) according to the formula:

$$W_t = a_3 W P_s \qquad V$$

wherein $a_3$ is a predetermined conversion constant. The digital computer means 60 also calculates the total load $W_A$ in long tons delivered by conveyor belt 21 during a time $t$ according to the formula:

$$W_A = \int_{t=0}^{t} W_t \, dt \qquad (VI)$$

If there are no significant non-linearities in the system or only one calibration weight ($T_1$) (preferably of the same magnitude as the expected load) is applied to the weigh scale station 10, the set of curve fitting linear equations (III) become:

$$K_0 + K_1 P_{w0} = 0$$

$$K_0 + K_1 P_{w1} = a_1 T_1$$

and formula IV becomes:

$$W = a_2 K_0 + a_2 K_1 P_w$$

solving the linear equations for $K_0$ and $K_1$ and substituting them in formula IV provides:

$$W = a_2(P_w - P_{w0}) \frac{a_1 T_1}{P_{w1} - P_{w0}} \qquad (VI)$$

At periodic intervals selected by the operator during operation of the conveyor, the load to the conveyor belt 12 is cut off and the system is recalibrated by running the conveyor belt empty, adding the calibration weights 14 in succession, calculating corrected values of ($P_{wi}$) and a corrected set of linearization coefficients ($K_i$). Load is then reapplied to the conveyor belt and the corrected values are substituted into whichever of formulae (IV) and (VII) is applicable to calculate the load carried by the conveyor belt. As mentioned above, the hoists 16 may be constructed to be remotely operated by the computer operator, thereby providing for convenient, fast and accurate calibration of the system.

Although the disclosure describes and illustrates a preferred embodiment of the invention, providing illustrative examples of values and component parts it is to be understood that substantial variations may be made to it while providing the same advantages within the scope of the invention. In particular, it is pointed out that other mathematical methods of curve fitting may be applied by the computer means in the case where there are significant non-linearities in the system.

SYMBOLS $a_1$ — conversion constant (weigh pulses/long tons · sec.)

$a_2$ — conversion constant (long tons · sec./ft. · weigh pulses)

$a_3$ — conversion constant (ft./weigh pulse)

$i(0,1,2 \ldots n)$ — number of calibration weights applied to weigh scale station $K_i(K_{1,2} \ldots n)$ — linearization coefficients $P_s$ — output of belt movement signal processing means (speed pulses/sec.)

$P_w$ — output of weight signal processing means (weigh pulses/sec.)

$P_{wi}(P_{w0,w1} \ldots)$ — average output of weight signal processing means during one revolution of empty belt with $i$ calibration weights applied (weigh pulses/sec.)

$T_i(T_{1,2} \ldots n)$ — calibration weight applied to weigh scale station (long tons)

$t_i(t_{0,1,2} \ldots n)$ — number of seconds for empty belt to complete one revolution with $i$ calibration weights applied W — load carried by conveyor belt (long tons/ft.)

$W_t$ — load carried by conveyor belt (long tons/sec.)

$W_A$ — total load delivered by conveyor belt during time interval $t$ (long tons)

FORMULAE $$P_{w0} = \frac{1}{t_0} \int_{t=0}^{t_0} P_w \, dt \qquad (I)$$

$$P_{w1} = \frac{1}{t_1} \int_{t=0}^{t_1} P_w \, dt \qquad (II)$$

$$\begin{array}{ll} K_0 + K_1 P_{w0} + \ldots + & K_n P_{w0}{}^n = a_1 T_0 \ (=0) \\ K_0 + K_1 P_{w1} + \ldots + & K_n P_{w1}{}^n = a_1 T_1 \\ - \quad - & - \quad - \\ - \quad - & - \quad - \qquad (III) \\ - \quad - & - \quad - \\ K_0 + K_1 P_{wn} + \ldots + & K_n P_{wn}{}^n = a_1 T_n \end{array}$$

wherein $a_1$ is a predetermined conversion constant.

$$W = a_2 \sum_{i=0}^{n} K_i P_w{}^i \qquad (IV)$$

$$W_t = a_3 W P_s \qquad (V)$$

$$W_A = \int_{t=0}^{t} W_t \, dt \qquad (VI)$$

$$W = a_2(P_w - P_{w0}) \left( \frac{a_1 T_1}{P_{w1} - P_{w0}} \right) \qquad (VII)$$

What we claim is:

1. Apparatus for automatically calibrating an endless conveyor belt load measurement system comprising the combination of:

a. movement measuring means having a digital pulse output ($P_s$) for measuring the movement of the conveyor belt,
b. means to determine one complete revolution of the conveyor belt,
c. scale means having a digital pulse output ($P_w$) adapted to measure the weight of successive portions of the conveyor belt and the load carried thereby,
d. hoist means for automatically successively applying at least three calibration weights of known values ($T_i$) to the scale means while the conveyor belt is empty, the three weights being respectively representative of lower, medium and upper ranges of the scale means, and
e. means connected to receive the digital pulse outputs of the movement measuring means and the scale means, the digital computer means adapted to:
  i. calculate the average pulse output of the scale means during one complete revolution of the empty conveyor belt ($P_{w0}$),
  ii. calculate the average pulse outputs ($P_{wi}$) of the scale means during one complete revolution of the empty conveyor belt with each of the calibration weights respectively applied to the scale means, and
  iii. substitute the said calculated average pulse outputs of the scale means into a set of curve fitting equations to calculate a set of linearization coefficients and then to substitute the said calculated linearization coefficients into formula to calculate the load carried by the conveyor belt.

* * * * *